(12) United States Patent
Abel et al.

(10) Patent No.: US 11,157,895 B2
(45) Date of Patent: Oct. 26, 2021

(54) PAYMENT DEVICES HAVING MULTIPLE MODES OF CONDUCTING FINANCIAL TRANSACTIONS

(71) Applicant: VERRENCY HOLDINGS LIMITED, Singapore (SG)

(72) Inventors: Miller Thomas Abel, Mercer Island, WA (US); Kenneth Mages, Chicago, IL (US)

(73) Assignee: VERRENCY HOLDINGS LIMITED, Singapore (SG)

( * ) Notice: Subject to any disclaimer, the term of this patent is extended or adjusted under 35 U.S.C. 154(b) by 541 days.

(21) Appl. No.: 15/239,122

(22) Filed: Aug. 17, 2016

(65) Prior Publication Data
US 2017/0053267 A1 Feb. 23, 2017

Related U.S. Application Data (60) Provisional application No. 62/282,991, filed on Aug. 17, 2015.

(51) Int. Cl.
| | |
|---|---|
| *G06K 19/06* | (2006.01) |
| *G06Q 20/34* | (2012.01) |
| *G06Q 20/40* | (2012.01) |
| *G06Q 20/32* | (2012.01) |

(52) U.S. Cl.
CPC ..... *G06Q 20/3572* (2013.01); *G06Q 20/3278* (2013.01); *G06Q 20/341* (2013.01); *G06Q 20/4014* (2013.01); *G06Q 20/4018* (2013.01)

(58) Field of Classification Search
CPC ...... G06K 19/00; G06K 19/067; G06K 19/07; G06Q 20/20; G06Q 20/206
USPC ................ 235/492, 380, 382, 383
See application file for complete search history.

(56) References Cited

U.S. PATENT DOCUMENTS

| | | | |
|---|---|---|---|
| 4,443,027 A | 4/1984 | McNeely et al. | |
| 5,276,311 A | 1/1994 | Hennige | |
| 7,163,153 B2* | 1/2007 | Blossom | G06K 19/06187 235/380 |
| 7,922,082 B2 | 4/2011 | Muscato | |
| 8,615,468 B2 | 12/2013 | Varadarajan | |
| 8,919,643 B2 | 12/2014 | Ashfield | |
| 2003/0111527 A1 | 6/2003 | Blossom | |

(Continued)

FOREIGN PATENT DOCUMENTS

WO WO 2011/005848 1/2011

*Primary Examiner* — Daniel St Cyr
(74) *Attorney, Agent, or Firm* — K&L Gates LLP (57) ABSTRACT

Payment cards and also the systems and methods for securely managing financial transactions using the payment cards are provided. In one implementation, a payment card includes a first component incorporated into a plastic substrate, wherein the first component is configured to provide details of a first substitute account associated with a cardholder's valid credentials. The payment card also includes at least one additional component incorporated into the plastic substrate. Each of the additional components is configured to provide details of at least one additional substitute account associated with the cardholder's valid credentials. Each substitute account includes details that are distinct from the details of each of the other substitute accounts. Also, at least one of the substitute accounts is provided to a merchant for conducting a financial transaction with the merchant.

16 Claims, 3 Drawing Sheets

(56) References Cited

U.S. PATENT DOCUMENTS

| | | |
|---|---|---|
| 2008/0017720 A1 | 1/2008 | Kranzley |
| 2009/0164380 A1* | 6/2009 | Brown ................ G06Q 20/341 |
| | | 705/65 |
| 2010/0268648 A1 | 10/2010 | Wiesman et al. |
| 2012/0153028 A1 | 6/2012 | Poznansky |
| 2014/0006277 A1 | 1/2014 | Rao |
| 2014/0258102 A1 | 9/2014 | Hirka et al. |

* cited by examiner

PAYMENT DEVICES HAVING MULTIPLE MODES OF CONDUCTING FINANCIAL TRANSACTIONS

CROSS-REFERENCE TO RELATED APPLICATIONS

This application claims the benefit of U.S. Provisional Application No. 62/282,991, filed Aug. 17, 2015, the entire disclosure of which is incorporated by reference herein.

FIELD OF THE INVENTION

The present disclosure generally relates to financial services, and more particularly relates to payment devices and systems for settling financial transactions.

BACKGROUND

Plastic payment cards, such as credit cards, were introduced in the United States in the late 1940s as a way for a bank's most trusted customers to pay for meals and travel without carrying large amounts of cash. Since then, billions of payment cards have been issued by tens of thousands of banks.

However, several types of illegal activities pose a threat to the security of conventional payment card systems. Identity theft, counterfeit activities, fraud, unauthorized account access, and other illegal activity compromise the integrity of the system. Conventional payment cards, and the networks used to authorize and settle card transactions, are vulnerable to widespread exploits by identity thieves and other criminals. One major form of payment account fraud is the unauthorized use of payment account details when conducting electronic commerce. Another major form of payment account fraud is the production and use of counterfeit cards at a merchant's point-of-sale (POS) device. These forms of fraud are inherent by the way that the payment cards themselves are produced. Specifically, credit card numbers and other payment account details, which are printed or embossed on a conventional plastic payment card, can easily be copied or stolen. Also, a payment card's magnetic stripe can be counterfeited. In fact, losses to banks, merchants, and consumers caused by payment card fraud is on a rapid rise. Payment card fraud costs the industry close to $20 billion annually.

To combat counterfeit and misappropriation fraud, which is the source of the majority of the financial risk to banks and payment brands, the major card issuing networks have adopted new technologies to ensure only legitimate cards are used at physical points of sale. These technologies, developed by the payment card industry and a consortium of card issuing networks (EMVCo), adds to the plastic card a tamper-resistant computer microchip with confidential storage and computing capability. EMVCo is a payment industry consortium named for EuroPay, MasterCard, and Visa, which are the original founders of the organization, but now also includes American Express, Discover, JCB, and Union Pay as equity partners.

This microchip confidentially stores the information and programs needed to generate a unique cryptographic signature at the time a transaction is made at a merchant POS. Computing processes are performed securely and confidentially inside the embedded microchip at the time of each transaction and the result is passed along with the payment account data through the existing payment network to the card issuing bank where it is verified using the same information stored in the card. The stored information is never disclosed by the issuer and cannot be extracted from the microchip by any practical means. The microchip-embedded card thus provides a one-time code for each card transaction performed at a physical point of sale. If all merchants honor this new mechanism, the risk that a counterfeit card could be produced by misappropriation of account data is largely eliminated.

Another way that card issuers attempt to combat fraud is by providing cards having near field communication (NFC) components. Cards that are enabled with NFC components allow a user to tap or pass the card near an NFC reader to within about 10 cm.

However, the microchip-embedded cards, also known as EMV cards or smart cards, and NFC-enabled cards must also work in environments that have not yet embraced the new standards. Many merchants have yet to adopt the EMV-enabled terminals that can activate the microchip cards and read the cryptographic code or the NFC readers that can read the wireless communication signals. To ensure payment cards are universally accepted, the card issuers include a conventional magnetic stripe on the back of the card.

Additionally, to enable electronic and telephone commerce, issuers include the payment account number either printed on the card and/or embossed into the plastic. Therefore, not only can the microchip and NFC components be used in making financial transactions, but also the magnetic stripe can be used in a financial transaction using a POS swiping process or the account numbers can be used in telephone or Internet transaction. The method by which the card communicates the account information to the merchant terminal is known as the mode. In other words, the microchip card can be utilized in at least four different modes of financial transactions, including, for example, magnetic stripe swiping mode, various modes using the EMV chip, NFC mode, and manual card number entry. The microchip may also enable additional modes, which is one reason why there may be more than four different modes of financial transactions.

A thief who encounters one of these new EMV or NFC payment cards and has physical control of the card even for a few brief moments can easily steal the sensitive payment account data without considering the embedded chip or NFC components. This can be done by reading the payment data from the magnetic stripe, in order to prepare a counterfeit card. The thief can also steal the data by taking a picture of the card and capturing the card numbers for fraudulent electronic commerce. It should be noted that both the magnetic stripe data and the printed data are not protected by digital security means like cryptography. The compromised data may then be used at less secure retail merchants, who have not yet adopted the EMV system, or the thief may go online to perform electronic commerce transactions.

Therefore, a need exists for more secure payment cards. To combat the above-mentioned problems, and to improve customer satisfaction and control of the payment card experience, the present invention introduces several innovative elements for payment cards and financial networks and the authorization and settlement of financial transactions.

SUMMARY

The present disclosure describes payment cards and systems and methods for securely managing financial transactions using the payment cards. A payment card may take such forms as, for example, a plastic payment card, a virtual card, a wearable commerce device, one or more components embedded in a mobile device, an application running on mobile devices or computers, and other payment credential forms. According to one implementation, a payment card comprises a first component incorporated into a plastic substrate, the first component configured to provide details of a first substitute account associated with a cardholder's primary financial account.

The payment card may also include additional components incorporated into the plastic substrate. The additional components are configured to provide details of additional substitute accounts associated with the cardholder's valid credentials. The first substitute account includes details that are distinct from the details of the second substitute account and are distinct from all additional substitute accounts. At least one of the first, second or additional substitute accounts is provided to a merchant for conducting a financial transaction with the merchant.

According to another implementation, an account correlating device comprises at least one network interface configured to communicate with a plurality of merchant terminals via a first network and to communication with a financial institution via a secure network. The account correlating device also includes a transaction authentication module configured to authenticate a first financial transaction for a first merchant terminal of the plurality of merchant terminals based on a first set of details obtained by the first merchant terminal of a first substitute account associated with a payment card owned by a cardholder. The transaction authentication module is further configured to authenticate additional financial transactions for additional merchant terminals of the plurality of merchant terminals based on additional, different set of details obtained by the additional merchant terminal of the additional substitute account associated with the payment card owned by the cardholder.

According to yet another implementation, a system for providing security for a payment card is provided. The system includes a first merchant terminal and an additional merchant terminal each connected to a network. The first merchant terminal is configured to obtain details of a first substitute account from a first set of information associated with a payment card owned by a cardholder. The additional merchant terminal is configured to obtain details of an additional substitute account from an additional set of information associated with the payment card. The system further includes an account correlating device connected to the network. The account correlating device is configured to receive the details of the first and additional substitute accounts from the first and additional merchant terminals, respectively. The account correlating device is further configured to associate the first and additional substitute accounts to a valid credential belonging to the cardholder. Furthermore, the account correlating device manages financial transactions between a financial institution, from which the cardholder retains the valid credential, and the first and additional merchant terminals. The first set of information is different from the additional sets of information.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

The present invention is directed to payment devices, hereafter referred to as a payment card, such as, for example, plastic payment cards, virtual cards, wearable commerce devices, components embedded in mobile devices, applications running on mobile devices or computers, and other payment credentials. The present invention is also directed to systems and methods for conducting financial transactions using the payment devices. The present invention may include a commercially viable computing service, mobile application, and web site and may be implemented in conjunction with a financial institution using payment cards or other payment devices as described herein. The present invention introduces several novel elements that can be employed by existing card and valid credential issuers to combat various forms of fraud. The term "valid credential" is used in this document to represent a valid funding instrument, which may be, but is not limited to, a credit card, charge card, direct deposit account, savings account, checking account, loyalty card, gift card, or other cards or devices.

The present invention includes multimodal payment devices, which can be used in various modes for different types of financial transactions. For example, payments cards described herein may include multiple modes for completing a transaction. Some modes may include those involving a microchip embedded in the card, those involving near field communication (NFC) components, those involving the magnetic stripe, those involving entering the card number and card verification value (CVV) in an online transaction, and/or other modes. The present invention includes novel fraud-reducing features, a mobile phone application, and a companion web site to control the novel fraud-reducing features. Also, a computing service can be used in the authorization and settlement networks serving both online and retail merchants.

Current issuing practice for payment cards is to include the cardholder's single primary account number (PAN) details, which correspond directly to the cardholder's actual valid credential, across all the various modes of the payment card (i.e., including magnetic stripe, EMV chip, NFC, etc.). However, by using a substitute account number, or token, in place of a primary account number (PAN), as is described in the present disclosure, an account correlating device can be interposed between the merchant and the issuing bank to supplement the security of transactions, or called by the issuing bank as part of processing the payment. The payment device systems described herein substitute cardholder PAN details securely, in the network, prior to transaction authorization and settlement. In this way, disclosure of the cardholder's PAN details to the merchant is prevented.

The present invention uses several distinct, anonymous, and unpredictable sets of substitute account details for each payment device. In the example of physical payment cards, one set of substitute account details may be associated with one or more modes of the EMV chip, another set may be associated with another mode of the EMV chip, another set of substitute account details may be associated with the NFC components, another set for the magnetic stripe, and another for use during electronic commerce, and yet another for manual entry. Using several distinct sets of substitute account details can prevent cross-mode payment fraud.

Current practice is to include the same PAN in the EMV chip that is included in the magnetic stripe and that is printed on the card. Financial transactions can then be accepted when any of the multiple modes is presented, which makes cross-modal fraud possible. For example, a thief might intercept the EMV card details and produce a counterfeit magnetic stripe card. Also, a thief might take both EMV and magnetic stripe account details, using card data readers, and perform unauthorized electronic commerce transactions. However, the present invention is not limited by the same PAN being used for all modes. Instead, the present invention uses multiple distinct sets of substitute account details corresponding to multiple valid credentials, where each substitute account can be associated with a distinct mode. In this way, cross-modal payment fraud can be prevented.

It should be noted that the payment devices described in the present disclosure may be implemented as credit cards, debit cards, virtual cards, wearable devices, Internet of things (IoT) devices, components and/or application embedded in mobile devices, and/or other financial credentials. In other embodiments, the payment devices described in the present disclosure may apply to non-payment devices that are used in other environments besides commerce. For example, non-payment devices (e.g., loyalty cards, mobile devices, and other non-financial credentials) may apply to other functions for standing in as a proxy credential to electronically authenticate identification, such as for health insurance purposes, driver's license purposes, etc., to gain access to a secure location, to provide a photographic identification of the cardholder, and for other purposes. Further, the valid credentials that may be associated with substitute account details may be payment and/or non-payment credentials, such as loyalty credentials, health insurance credentials, and other financial or non-financial credentials.

Figure 1:
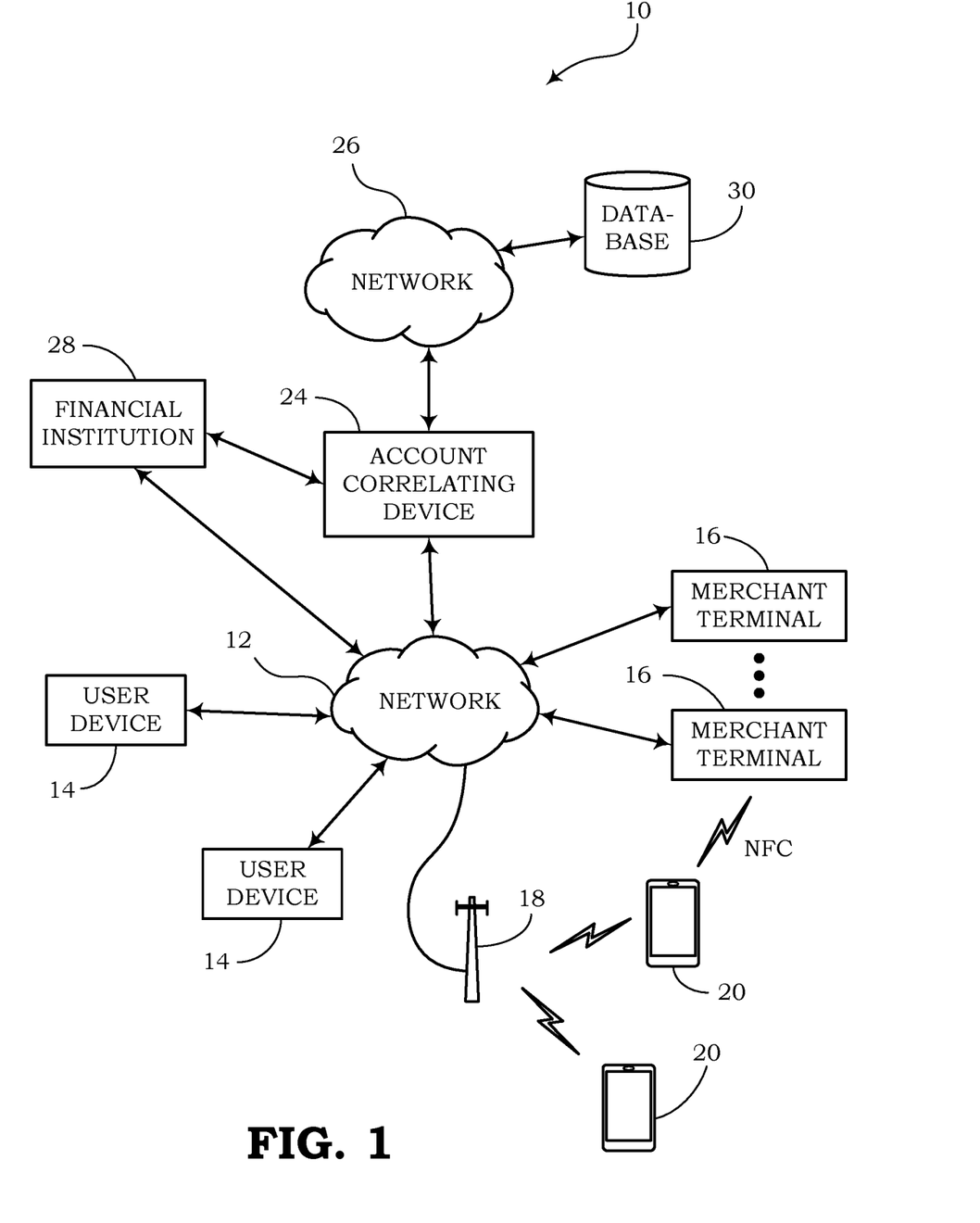
FIG. 1 is a block diagram illustrating a payment card system according to various implementations of the present disclosure.

FIG. 1 is a block diagram illustrating an embodiment of a payment card system 10 in which a financial institution 28 issues a payment card, such as a credit card or debit card, to a customer. In other embodiments, the customer may use another type of proxy credential other than a payment card, such as a mobile device. According to the embodiment of FIG. 1, the payment card system 10 includes a public network 12, one or more user devices 14, one or more merchant terminals 16, one or more wireless communication antennas 18, one or more mobile devices 20, and an account correlating device 24.

The term "merchant terminal" is used to describe a physical terminal, website, or other devices for providing functionality by a merchant at which a payment is originated. Merchant terminals can be embedded in POS equipment and can be "virtual" as in ecommerce website processing. Also, merchant terminals can be background devices where no card, customer, merchant, or goods are involved, such as when recurring payments are initiated for services. The "merchant terminal" may represent POS devices, merchant online systems, and other mechanisms owned/controlled by the merchant to conduct various modes of purchase. The merchant terminals may include any merchant systems used in different payment modes using one or more types of technologies (e.g., EMV chip, magnetic stripe, NFC, e-commerce, etc.).

The network 12 may include a wide area network, the Internet, private networks, and/or other publicly accessible networks. Also, the network 12 may include local area networks associated with various merchants. The network 12 may also be in communication with one or more cellular networks connected to the antennas 18.

The user devices 14, merchant terminals 16, and antennas 18 may be connected by one or more wired or wireless connections to the network 12 to enable electronic communication among the various components. The wireless communication antennas 18 may include one or more cellular towers, orbiting satellites, or other wireless communication hubs for communication with the mobile devices 20.

The account correlating device 24 could be a server, a web server, software running on a server, a hardware appliance, or any suitable intermediary computing device or means for providing various transaction services. The account correlating device 24 is also connected to a secure network 26, which is also connected via wired or wireless connections to one or more financial institutions 28 and one or more databases 30. The secure network 26 may be a private network, local area network, a virtual private network (VPN), or a public network with a high level of encryption. The account correlating device 24 may be configured to store information in the database 30 that directs one or several substitute accounts to an authentic account owned by a cardholder or customer of the financial institution 28.

During a purchasing operation, the customer to whom a payment card has been issued may use the payment card as payment for merchandise or services. The payment card can be presented to a merchant at one of the merchant terminals 16. It should be noted that several merchant terminals 16 may be associated with the same merchant for obtaining account information through various modes. In fact, multiple merchant terminals 16 may be associated with a single device used by a merchant for obtaining information at a single POS device. Accordingly, the POS device may obtain information from the payment card by a first mode utilizing a microchip embedded in the card or by additional modes, which may involve the use of the NFC components or magnetic stripe on the card. In other transactions, such as online or telephone transactions, the card number printed and/or embossed on the card may be entered electronically or by an order-taking representative of the merchant.

According to alternative embodiments, the payment card system 10 may instead be configured as a system for performing non-payment actions. Instead of conducting various functions related to financial accounts as disclosed herein, the non-payment system may process other types of credentials for entities other than financial institutions.

The account correlating device 24 uses the database 30 to associate arbitrary substitute account data values to details of a cardholder's valid credential. The arbitrary substitute account data values and valid credential details may be provided by the cardholding customer at the time of enrolling in a service provided by the account correlating device 24. In one embodiment, the cardholding customer may change the valid credential details that are associated to the substitute account at any time using a mobile application on one of the mobile devices 20 or via a web service provided by the account correlating device 24 using a user device 14, which may be a conventional computer or web browser. The account correlating device 24 enables multiple valid credentials to be associated with multiple substitute accounts. The valid credentials may be financial or non-financial credentials. In one embodiment, the account correlating device 24 enables valid credentials from the issuing cardholder financial institution 28 to be associated with the multiple substitute accounts. In one embodiment, the account correlating device 24 enables valid credentials from both issuing cardholder financial institution 28 as well as other financials or non-financial institutions to be associated with the multiple substitute accounts.

The account correlating device 24 is deployed into the payment card system 10 such that all transactions presented by a merchant via one of the merchant terminals 16 for authorization against one of the multiple substitute accounts represented on each card are received by the account correlating device 24. The account correlating device 24 associates the multiple substitute accounts with one or more of the customer's valid credentials using a customizable rules engine, which is sensitive to one or more facts including, but not limited to, the current transaction data. The current transaction data may include, for example, but is not limited to, merchant category code, merchant ID, amount of transaction, substitute account number, service code, card security code, etc.

The account correlating device 24 may also have access by way of the database 30 to data including, but not limited to, prior transactions presented for the specific substitute account, prior transactions presented for another substitute account associated with the same cardholding customer, prior transactions for other customers of the same merchant or merchant location, the geographic location of the cardholding customer's primary mobile phone at the time the transaction is presented. The geographic location may be determined, for example, by the Global Positioning System (GPS), proximity to radio signals such as WiFi™, Bluetooth™, Bluetooth Low Energy beacons, Zigbee™, Zwave™, or any combination of these and other location-sensitive factors. The substitute accounts, which can be associated with a valid credential, have themselves, unless otherwise associated, no balance or established credit and cannot be used to settle any transactions.

The payment card system 10 may be used to provide security for the use of a payment card. The payment card system 10 may include a first merchant terminal 16 connected to a public network 12, wherein the first merchant terminal 16 is configured to obtain details of a first substitute account from a first set of information associated with a payment card owned by a cardholder. The payment card system 10 may include a second merchant terminal 16 connected to the public network 12, wherein the second merchant terminal 16 is configured to obtain details of a second substitute account from a second set of information associated with the payment card. In this embodiment, the payment card system 10 also includes an account correlating device 24 connected to the public network 12. The account correlating device 24 is configured to receive the details of the first and second substitute accounts from the first and second merchant terminals 16, respectively. The account correlating device 24 is further configured to associate the first and second substitute accounts to valid credentials belonging to the cardholder. The account correlating device 24 also manages financial transactions between a financial institution 28, from which the cardholder retains the valid credential, and the first and second merchant terminals 16. Also, it should be noted that the first set of information is preferably different from the second set of information.

The payment card system 10 may also include a third merchant terminal 16 connected to the public network 12, wherein the third merchant terminal 16 may be configured to obtain details of a third substitute account from a third and preferably different set of information associated with the payment card. In some embodiments, the first set of information is obtained from a microchip on the payment card, the second set of information is obtained from NFC components embedded in the payment card, the third set of information is obtained from a magnetic stripe on the payments card, and the fourth set of information is obtained from card numbers printed and/or embossed on the payment card. Additional sets of information obtained from various other modes now known or later developed may also be obtained. The first, second, third, fourth and other sets of information may be generated by the financial institution. Some of these sets of information may be manually entered.

An alternative embodiment includes the payment card system 10 in which the payment card is devoid of a printed and/or embossed account number. Also, the payment card may be devoid of a magnetic stripe, or one of the other modes. In this case, the cardholder may use the payment card at a merchant terminal using only the microchip and/or NFC components, or the modes remaining on the card.

A different set of account details may be communicated to the cardholder for conducting an online or telephone transaction. The different set of details may be mailed, emailed, or texted to the cardholder via a computer (e.g., user device 14) and/or via a mobile device 20.

In some embodiments, the mobile device 20 associated with the cardholder may be incorporated in the system 10. One of the merchant terminals 16 may be an online merchant device configured to conduct an online transaction, and the mobile device 20 may be configured to store, retrieve one generated from the account correlating device 24 or calculate a dynamic card verification value (d-CVV), which is transmitted to, or manually entered into, the online merchant device. In some cases, one or more of the merchant terminals 16 may be embedded within point-of-sale (POS) devices.

The user device 14 associated with the cardholder is configured to enable the cardholder to manage the substitute accounts and the valid credentials via the account correlating device 24. The account correlating device 24 is configured to enable the cardholder to enter enrollment information, monitor the activities of the substitute accounts, enable and disable one or more modes of conducting transactions with the payment card, report if the payment card has been lost or stolen, and provision information related to the various valid credentials. For example, the account correlating device 24 may provide a website including one or more webpages enabling the cardholder to navigate the website potentially using the user device 14.

Figure 2A:
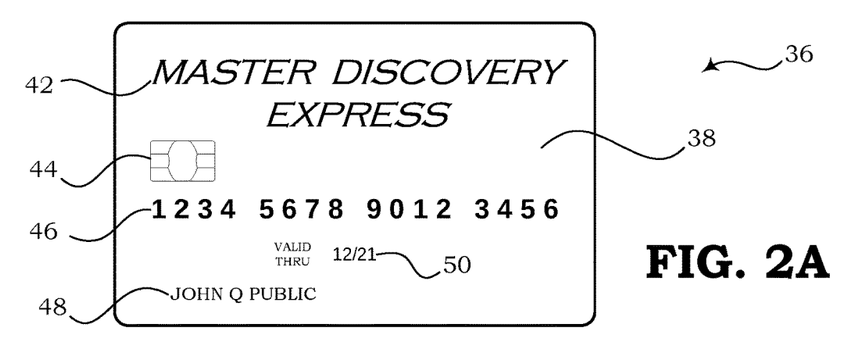
FIGS. 2A and 2B are diagrams illustrating a front view and back view, respectively, of a first payment card according to various implementations of the present disclosure.
Figure 2B:
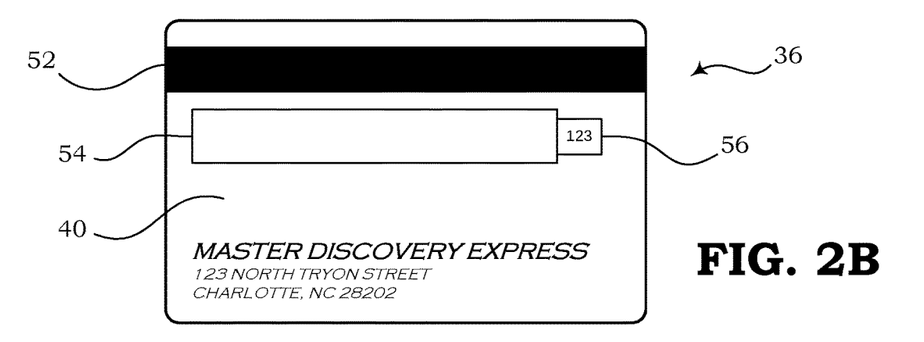

FIGS. 2A and 2B illustrate a first type of payment card 36 according to various embodiments of the present invention. FIG. 2A shows a front side 38 of the payment card 36 and FIG. 2B shows a back side 40 of the payment card 36. The payment card 36 may include a name 42 of the financial institution 28, a microchip 44, a card number 46, a customer name 48, and an expiration date 50 on the front side 38 of the payment card 36. In some embodiments, the card number 46 may be embossed in the payment card 36. In addition, the back side 40 of the payment card 36 may include a magnetic stripe 52, a signature box 54, and a card verification value (CVV) 56. The payment card 36 may further include NFC components, which may be embedded under the surface of the payment card 36, for enabling touchless transactions.

In one embodiment, the payment card 36 may be a plastic EMV microchip card that is issued by a card-issuing bank according to the issuing rules for one of several global branded payment card networks. The payment card 36 includes provisioning and personalization such that it may be used at any EMV-enabled merchant POS.

However, the account details included in the microchip 44 are not those of the primary card holder, but rather are arbitrary values generated by the card issuer. The account details may be referred to herein as "substitute account details." The substitute account details are used as a stand-in for a valid credential but do not identify any particular customer. They refer instead to a substitute account generated by the card issuing bank but not associated with any particular valid credential.

In the embodiment of FIG. 2, the microchip 44 and magnetic stripe 52 contain distinct payment account numbers, expiration dates, and other token account details for two different substitute accounts. Simply, the microchip 44 and magnetic stripe 52 appear to represent completely distinct payment accounts. A transaction performed with the microchip 44 at an EMV-enabled merchant will contain different account details than a transaction performed at a merchant using the magnetic stripe 52 on the same card 36. Also, an NFC transaction may utilize payment account details that differ from the both the EMV-enabled mode and the magnetic stripe mode.

In one embodiment, the financial institution 28 provides the customer with substitute account details for use in electronic commerce and telephone commerce transactions such that the details are distinct from either the substitute account details for the microchip 44 or the magnetic stripe 52. It will be appreciated that facsimile, electronic mail, and other forms of electronic and telephone communication may also be used. It will also be appreciated that the substitute account details may be recorded on a mail order form for transactions conducted through the mail. The electronic commerce substitute account details may not be printed or embossed on the payment card 36 but provided separately to the customer, or may be printed or embossed on the payment card, depending upon the embodiment.

Figure 3A:
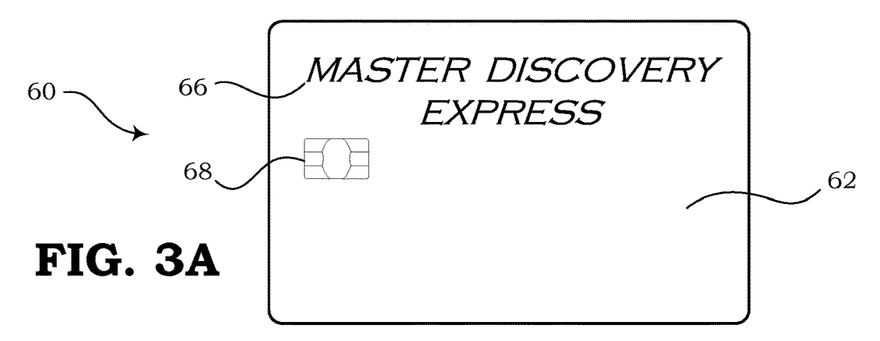
FIGS. 3A and 3B are diagrams illustrating a front view and back view, respectively, of a second payment card according to various implementations of the present disclosure.
Figure 3B:
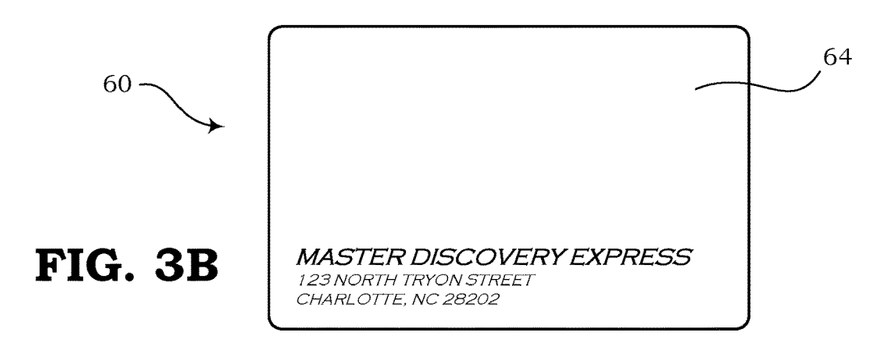

FIGS. 3A and 3B illustrate a second type of payment card 60 according to various embodiments of the present invention. FIG. 3A shows a front side 62 of the payment card 60 and FIG. 3B shows a back side 64 of the payment card 60. The payment card 60 may include a name 66 of the financial institution and a microchip 68 on the front side 62 of the payment card 60. It should be noted that the payment card 60 is devoid of a card number and the customer's name that may normally appear on a conventional payment card. The back side 64 of the payment card 60 may be blank or may simply include a name and address of the financial institution. The back side 64 is therefore devoid of a conventional magnetic stripe and CVV number. The payment card 60 has no pre-printed account number, embossed account data, expiration data, cardholder name, or other account data. By making the card anonymous and without including a human-readable account number, the trivial theft of account data from the face and back of the card can be prevented.

Currently, Visa™ and MasterCard™ include rules for their credit and debit cards that require the cardholder's name and account number to be displayed on the card. Therefore, the embodiment of FIG. 3 does not follow these present day rules. Nevertheless, the payment card 60 as described in the present disclosure can be carried in public without the risk of being lost or stolen, since the cardholder name and account number cannot be retrieved visually. For online, mail order, telephone, and similar transactions, a separate card or electronic file can be safely stored at the cardholder's home.

In some embodiments, the payment card 36, 60 may be formed from a plastic substrate. A first component (e.g., the microchip 44) may be incorporated into the plastic substrate on the cards shown in FIGS. 2 and 3. The first component may be configured to provide details of a first substitute account associated with a cardholder's valid credentials. The payment card 36 of FIG. 2 may also include additional components incorporated into the plastic substrate. The additional components are configured to provide details of additional substitute accounts associated with the cardholder's valid credentials. The first substitute account includes details that are distinct from the details of the second substitute account and are distinct from all additional substitute accounts. At least one of the first, second or additional substitute accounts is provided to a merchant (e.g. using a merchant terminal 16) for conducting a financial transaction with the merchant The merchant is configured to communicate the details of the at least one of the substitute accounts to the account correlating device 24 via the network 12. The account correlating device 24 is configured to associate at least one of the substitute accounts to one of the cardholder's valid credentials, and wherein the account correlating device 24 is further configured to manage financial transactions between the financial institution 28 associated with the cardholder's primary financial account and the merchant terminal 16 associated with the merchant.

According to some embodiments, the payment card 36 of FIG. 2 may further include an additional component (e.g., card number 46) incorporated in the plastic substrate. The card number can be printed and/or embossed on the plastic substrate. In alternative embodiments, the payment card (e.g., payment card 60) may be devoid of at least one of a printed or embossed account number, a magnetic stripe, and or other modes.

The details of the first, second and additional substitute accounts may be read from the first, second, and additional components by a point-of-sale (POS) device, such as the merchant terminal 16. In order to conduct a financial transaction, some implementations may include use of the mobile device 20, which is associated with the cardholder.

Figure 4:
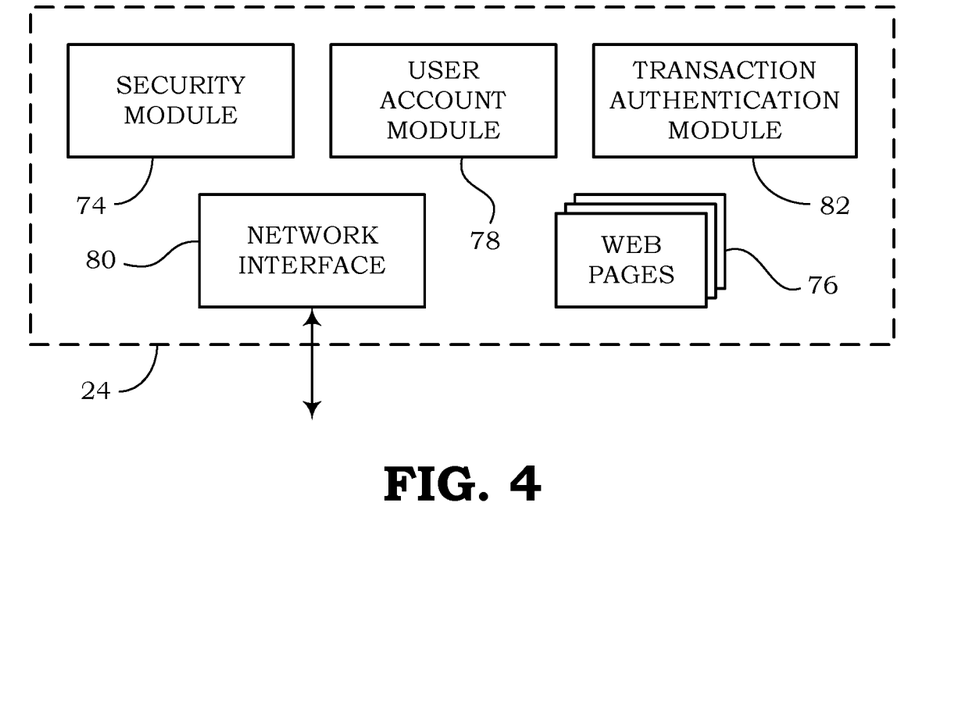
FIG. 4 is a block diagram illustrating the account correlating device shown in FIG. 1 according to various implementations of the present disclosure.

FIG. 4 is a block diagram showing an embodiment of the account correlating device 24 shown in FIG. 1. In the embodiment of FIG. 4, the account correlating device 24 includes a security module 74, one or more web pages 76, a user account module 78, one or more network interfaces 80, and a transaction authentication module 82. The one or more network interfaces 80 are configured to enable communication on the first public network 12 and also to enable communication on the secure network 26. The user account module 78 allows a user, or customer, to perform a number of different actions related to the financial account and how the payment card 36, 60 can be used. The user account module 78 is described in more detail below with respect to FIG. 5.

The security module 74 may include a random number generator for generating a temporary dynamic card verification value (d-CVV). The d-CVV may be communicated to the mobile device. Also, the security module 74 may include an encryption engine for encrypting data transmitted over the public network 12. The account correlating device 24 may be configured as a web server that allows one or more users to access information from the web pages 76 and to establish a secure connection to enable the transfer of sensitive data, such as customer information, card numbers, etc. The transaction authentication module 82 is configured to authenticate a financial transaction using the payment card 36, 60.

In one embodiment, the token account details are protected by encryption using a cryptographic key, which can be provided by the security module 74. In one embodiment, the cryptographic key is derived from a customer created password. In another embodiment, the cryptographic key may instead depend on other data, including, but not limited to, the identity of the mobile device 20, the cardholding customer's identity number known to the security module 74 of the account correlating device 24, the country in which the cardholding customer registered for the computing service, a master key controlled by biometric authentication of the cardholder, such as fingerprint, iris scan, facial or voice recognition, or biorhythmic pattern matching one or more body rhythms including, but not limited to, pulse rate, epidermal conductivity, iris size, blink rate, encephalography, electrocardiography, or other factors that are independently or in combination considered as biomarkers for individuality.

Normal plastic cards may have a single three- or four-digit CVV imprinted on either the back or front of the card. Electronic commerce sites now routinely ask for this value to ensure the customer has the card in their possession. But since the CVV is a short number printed on the card, it can easily be stolen together with the card account data. Therefore, use of a dynamic CVV (d-CVV), which may be generated by the security module 74 at the time of the transaction, and good for only one transaction, prevents this form of theft. In some embodiments, instead of using the generated d-CVV for only one transaction, the d-CVV may apply to multiple transactions associated with a specific merchant or may be used multiple times according to other criteria, such as a range of days, certain days of the week, area code of merchant, category of purchase, etc. According to some embodiments, a mobile application running on a mobile device 20 associated with the cardholder may be configured to retrieve the d-CVV on demand. Alternatively, a web site provided by the account correlating device 24 may be used when the mobile device 20 is unavailable. Therefore, in this case, the account correlating device 24 may generate the d-CVV.

In addition to use during financial transactions, the system 10 may alternatively be applied to non-payment uses. For example, the system 10 may be used for replacing some form of identifier with a token or substitute identifier. Such identifiers might include social security numbers (in the U.S.), public health identification numbers, loyalty programs, other forms of account numbers where a risk of disclosure, identity theft, or other fraud might be possible using the genuine number.

The account correlating device 24 may also find application to provide limited transaction access to protected record sets such as medical records requests, laboratory results, credit inquiries, professional licensing, commercial licensing, and other forms of relying party inquiries which utilize a government or enterprise issued identifying account number.

The payment card system 10 may also be used in some transactions for non-payment uses which could include driving licenses, border control documents, building and resource access cards, and gift cards. In this embodiment, the payment card 36, 60 may use one or more of the modes for non-payment uses while still using one or more of the modes for payment transactions using separate substitute account details for different modes.

In some embodiments, the account correlating device 24 may include at least one network interface 80 configured to communicate with a plurality of merchant terminals 16 via the first public network 12 and to communication with the financial institution 28 via the secure network 26. For example, the financial institution 28 may be a bank that issues the payment card 36, 60 to the cardholder. The account correlating device 24 may also include the transaction authentication module 82 configured to authenticate a first financial transaction for a first merchant terminal of the plurality of merchant terminals 16 based on a first set of details obtained by the first merchant terminal of a first substitute account associated with a payment card 36, 60 owned by a cardholder. The transaction authentication module 82 may be further configured to authenticate a second financial transaction for a second merchant terminal of the plurality of merchant terminals 16 based on a second, different set of details obtained by the second merchant terminal of a second substitute account associated with the payment card 36, 60 owned by the cardholder.

The transaction authentication module 82 may be further configured to determine if the substitute accounts correspond to valid credential of the cardholder. The transaction authentication module 82 may be further configured to determine if the received substitute account details correspond to the expected substitute account details for the mode of payment card that was used. The transaction authentication module 82 is further configured to manage financial transactions between the financial institution 28 and the first and second merchant terminals 16. The transaction authentication module 82 is further configured to authenticate additional financial transactions for additional merchant terminals of the plurality of merchant terminals 16 based on additional set of details obtained by the additional merchant terminals of additional substitute accounts associated with the primary account of the payment card 36, 60 owned by the cardholder. The first set of details may be obtained from a microchip 44 on the payment card 36, 60, the second set of details may be obtained from a magnetic stripe 52 on the payment card 36, and a third set of details may be obtained from card numbers 46 printed and/or embossed on the payment card 36.

The network interface 80 may be further configured to communicate with a remote device (e.g., user device 14 or mobile device 20) associated with the cardholder via the network 12. The network interface 80 may be further configured to receive instructions from the remote device 14, 20 to enable the cardholder to manage a primary account associated with the payment card 36, 60, wherein managing the primary account includes at least one of entering enrollment information 86, monitoring 94 the activities of the primary account, enabling and disabling 90 one or more modes of conducting transactions with the payment card, reporting 92 that the payment card has been lost or stolen, and provisioning 88 information related to the first and second substitute accounts.

Figure 5:
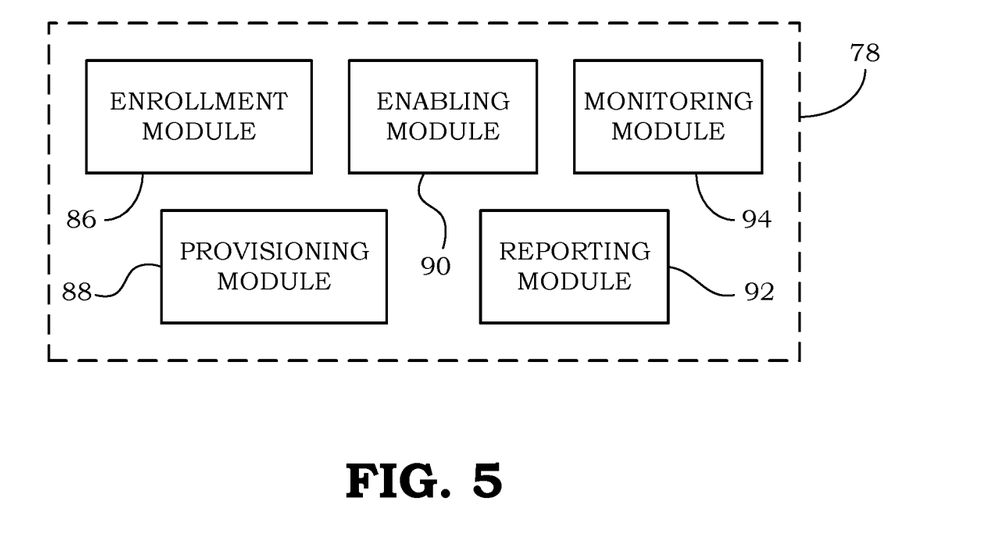
FIG. 5 is a block diagram illustrating the user account module shown in FIG. 4 according to various implementations of the present disclosure.

FIG. 5 is a block diagram showing an embodiment of the user account module 78 shown in FIG. 4. In this embodiment, the user account module 78 includes an enrollment module 86, a provisioning module 88, an enabling module 90, a reporting module 92, and a monitoring module 94. A user may access the user account module 78 using a mobile application running on the cardholder's mobile device 20 or by accessing a web site provided by the account correlating device 24 using the cardholder's user device 14.

The user account module 78 enables the cardholding customer to establish and manage rules which the account correlating device 24 implements on the cardholding customer's behalf. Such rules may be sensitive to one or more facts known to the cardholding customer, including, but not limited to, payment value, merchant ID, local time and date encoded in a transaction message, the distance of registered location of the merchant from the geographic location of the cardholding customer's mobile device at the time of the transaction, the local currency of the transaction, the country in which the transaction is presented, the country in which the merchant is established, whether the transaction is presented as a magnetic stripe transaction, as an EMV transaction, or as an electronic commerce, telephone, or mail order transaction, and the method of cardholder verification such as one or more of, but not limited to, entry of a personal identification number (PIN) code into the merchant POS terminal, signing a receipt, entering a passcode into a mobile device, and fingerprint or other biometric identification method.

The enrollment module 86 may be configured to enable a cardholder to enroll additional substitute accounts and additional valid credentials. The enabling module 90 may be used to allow the cardholder to enable or disable certain modes or types of transactions depending on the various uses that the cardholder may anticipate based on various criteria, or to enable or disable specific transactions themselves, prior to their authentication. The enabling module 90 may be used to allow the cardholder to nominate which valid credential a payment will be charged against in a variety of scenarios or criteria. The reporting module 92 allows the user to report if the payment card 36, 60 has been lost or stolen. One embodiment of the reporting module 92 may enable the account correlating device 24 to report manually or automatically relevant information to the user or financial institution 28, including reporting potentially fraudulent activity across the substitute account details and/or payment card. The monitoring module 94 allows the user to view previous transactions to monitor all activity of the card.

The provisioning module 88 may allow the user to separately distinguish the multiple different sets of substitute account details. Conventional card issuing systems may assume that certain data elements are shared among the microchip, magnetic stripe, and printed/embossed card number. However, as opposed to the conventional card issuing systems, the provisioning module 88 allows the provisioning of each of these and further elements using separate data elements. The provisioning module 88 is configured to separately identify these multiple distinct sets of substitute account data, which may be stored in a common provisioning data file conveyed during card provisioning steps.

A cardholder may become subject to unauthorized use of their payment card 36, 60 if it is lost or stolen. However, although in some countries a thief may be able to use the NFC features for purchases under to certain spending threshold (e.g., $100), the thief will normally not be able to use the EMV features of the card without the cardholder's PIN code, which can be entered during the provisioning process using the provisioning module 88. Also, the stolen card cannot be used for electronic or telephone commerce due to the distinct account details for this separate transaction mode.

The provisioning module 88 may further include receiving identifying information of the cardholder that is not printed on the payment card 36, 60. According to some embodiments, the provisioning module 88 may set up the cardholder's usage rules by requiring the presence of the cardholder's mobile device 20 in conjunction with the transaction using the payment card 36, 60. Also, the mobile application of the mobile device 20 may be used to instantly block transactions from a stolen card that is reported stolen by the reporting module 92. The user account module 78 might configure its rules to prevent magnetic stripe transactions unless they are unlocked each time by the cardholder using the mobile application on the mobile device 20. This latter method would effectively prevent the use of counterfeit magnetic stripe cards. The user account module 78 might also configure its rules to prevent transactions from any and all different modes, or to prevent transactions that fall under certain criteria, unless they are unlocked each time by the cardholder.

In one embodiment, a mobile application is available on the cardholding customer's primary mobile device 20. The mobile application may be used by the cardholding customer to enroll a substitute account or valid credential into the account correlating device 24, control the provisions or associations of the valid credentials with the one or more substitute account details provisioned to the payment card. The mobile application also allows the user to enable or disable the authorization of transactions presented with any of the substitute accounts provisioned to the plastic payment card, report the payment card as lost or stolen, and as an additional authentication factor for sensitive or high-value or high-risk transactions.

The mobile device 20 may also store substitute account details, which may be associated with "card present" transactions and "card not present" transactions, in memory. These substitute account details may be stored in the memory and can be recalled by the customer by entering a password and/or another authentication factor into the mobile device 20. As a means for interacting with electronic commerce sites, the mobile application securely holds the electronic commerce substitute account details and displays them for the user upon proper authentication with password, biometrics, and/or other factors. In another embodiment, the substitute account details are transmitted by account correlating device 24 and are received by the mobile device 20, which can then be recalled by the customer by entering a password and/or another authentication factor into the mobile device 20.

The implementations described herein represent a number of possible implementations and examples and are not intended to necessarily limit the present disclosure to any specific implementations. Instead, various modifications can be made to these implementations as would be understood by one of ordinary skill in the art. Any such modifications are intended to be included within the spirit and scope of the present disclosure.

The invention claimed is:

1. A system for providing security for payment cards, the system comprising:
   a payment card issued to a cardholder, the payment card storing substitute account identifiers for a plurality of substitute accounts, the card configured to provide a different substitute account identifier for each different mode of obtaining account details from the card in a transaction, the payment card further comprising
a plastic substrate,
a card number printed or embossed on the plastic substrate, wherein the card number includes a first substitute account identifier associated with a cardholder's valid credentials,
a magnetic stripe incorporated in or on the plastic substrate, the magnetic stripe storing a second substitute account identifier associated with the cardholder's valid credentials, the second substitute account identifier being different than the first substitute account identifier, and configured to provide the second substitute account identifier when the magnetic stripe is read by merchant terminals in financial transactions, and
a microchip or near field communication (NFC) device incorporated in or on the plastic substrate and storing a third substitute account identifier associated with the cardholder's valid credentials, the third substitute account being different than the first and second substitute account identifiers, the microchip or NFC device configured to provide the third substitute account identifier when the microchip or NFC device is read by merchant terminals in financial transactions;
a first merchant terminal connected to a network and configured to obtain the first substitute account identifier from the payment card by manual entry as part of a first purchase transaction made by the cardholder with the first merchant terminal;
a second merchant terminal connected to a network and including a magnetic stripe reader, the first merchant terminal configured to obtain the second substitute account identifier from the magnetic stripe of the payment card as part of the second purchase transaction made by the cardholder with the second merchant terminal;
a third merchant terminal connected to the network and including a microchip or NFC reader, the second merchant terminal configured to obtain the third substitute account identifier from the payment card using the microchip or NFC reader as part of a third purchase transaction made by the cardholder with the third merchant terminal;
and
an account correlating device connected to the network, the account correlating device configured
to receive the first substitute account identifier together with information identifying the mode of the first purchase transaction, and to associate the first substitute identifier with valid credentials belonging to the cardholder, and to validate the first purchase transaction, at least in part, by confirming the mode of the first purchase transaction is the expected mode for the first substitute account identifier, and to manage a first financial transaction between a financial institution from which the cardholder retains the valid credentials and the first merchant terminal, and
to receive the second substitute account identifier together with information identifying the mode of the second purchase transaction, and to associate the second substitute identifier with valid credentials belonging to the cardholder, and to validate the second purchase transaction, at least in part, by confirming the mode of the second purchase transaction is the expected mode for the second substitute account identifier, and to manage a second financial transaction between the financial institution and the second merchant terminal, and
to receive the third substitute account identifier together with information identifying the mode of the third purchase transaction, and to associate the third substitute identifier with valid credentials belonging to the cardholder, and to validate the third purchase transaction, at least in part, by confirming the mode of the third purchase transaction is the expected mode for the third substitute account identifier, and to manage a third financial transaction between the financial institution and the third merchant terminal, and;
wherein the account correlating device is further configured to block or suspend a financial transaction involving a received substitute account identifier when the mode of the transaction does not match the expected mode for the received substitute account identifier.

2. The system of claim 1, wherein the microchip is incorporated in or on the plastic substrate and stores the the third substitute account identifier, the system further comprising:
a near field communication (NFC) device incorporated in or on the plastic substrate and storing a fourth substitute account identifier associated with the cardholder's valid credentials and configured to provide the fourth substitute account identifier to merchant terminals when the NFC device is read by merchant terminals in financial transactions; and
a fourth merchant terminal connected to the network and including an NFC reader, the fourth merchant terminal configured to obtain the fourth substitute account identifier from the Payment card using the NFC reader as part of a fourth purchase transaction made by the cardholder with the fourth merchant terminal.

3. The system of claim 1, wherein the mode of the transaction and the expected mode of the transaction are each selected from the group consisting of a microchip on the payment card, a near field communication (NFC) device on the payment card, a magnetic stripe on the payment card, and online entry of card numbers printed or embossed on the payment card.

4. The system of claim 1, wherein the second and third merchant terminals are a point-of-sale (POS) devices.

5. The system of claim 1, wherein the account correlating device further includes a network interface configured to communicate with a remote device associated with the cardholder via the network.

6. The system of claim 5, wherein the network interface is further configured to receive instructions from the remote device to to manage a valid credential associated with the payment card, wherein managing the valid credential includes at least one of entering enrolment information, monitoring the activities of the valid credential, enabling or disabling one or more modes of conducting transactions with the payment card, reporting that the payment card has been lost or stolen, and provisioning information related to the multiple substitute accounts associated with the card.

7. The system of claim 1, further comprising one or more webpages of a website enabling the cardholder to manage the details or navigate the website using the user device.

8. The system of claim 1, further comprising additional merchant terminals connected to the network, the additional merchant terminals configured to obtain additional substitute account identifiers the payment card.

9. The system of claim 1, further comprising a mobile device associated with the cardholder.

10. The system of claim 9, wherein the mobile device calculates, stores or receives a dynamic card verification value (d-CVV) to verify a transaction.

11. The system of claim 10, wherein the first terminal is an online merchant device configured to conduct an online transaction, and is configured to receive the d-CVV.

12. The system of claim 1, wherein at least one of the second and third merchant terminals is embedded within a physical point-of-sale (POS) device.

13. The system of claim 1, further comprising a user device associated with the cardholder, the user device configured to allow the cardholder to manage the valid credentials via the account correlating device, and wherein the account correlating device is configured to allow the cardholder to enter enrollment information, monitor the activities of the valid credentials and associate them to various substitute accounts, permit or disable one or more modes of conducting transactions with the payment card, report that the payment card has been lost or stolen, and provision information related to the first and second substitute accounts.

14. The system of claim 13, further comprising:
a webserver hosting website including one or more webpages navigable by the user using the user device, the webserver in communication with the account correlating device.

15. The card of claim 1, wherein the microchip is an EMV microchip.

16. The system of claim 1, further comprising:
additional merchant terminals connected to the network, the additional merchant terminals configured to obtain details of additional substitute accounts from additional sets of information associated with the payment card.

* * * * *